| United States Patent [19] | [11] | 4,049,580 |
|---|---|---|
| Oden et al. | [45] | Sept. 20, 1977 |

[54] METHOD FOR PRODUCING SUPPORTED RANEY NICKEL CATALYST

[75] Inventors: Laurance L. Oden; Philip E. Sanker, both of Albany; James H. Russell, Corvallis, all of Oreg.

[73] Assignee: The United States of America as represented by the Secretary of the Interior, Washington, D.C.

[21] Appl. No.: 707,973

[22] Filed: July 23, 1976

[51] Int. Cl.$^2$ .......................... B01J 21/04; B01J 23/74
[52] U.S. Cl. .............................. 252/466 J; 252/477 Q
[58] Field of Search ....................... 252/466 J, 477 Q; 427/247, 383 C, 383 D, 431

[56] References Cited

U.S. PATENT DOCUMENTS

| 3,000,755 | 9/1961 | Hanink et al. | 427/383 D |
|---|---|---|---|
| 3,627,790 | 12/1971 | Stiles | 252/477 Q |
| 3,937,858 | 2/1976 | Thiele | 427/431 |

*Primary Examiner*—W. J. Shine
*Attorney, Agent, or Firm*—William S. Brown; Donald A. Gardiner

[57] ABSTRACT

A method for making a supported Raney nickel catalyst by coating a nickel substrate with aluminum or aluminum-nickel alloy, heat treating the coated substrate above the melting point of aluminum but below 1133° C, quenching at a temperature below 854° C to form $NiAl_3$ as a solid phase in the substrate. The Raney nickel alloy coating is activated in the usual manner by leaching with sodium hydroxide solution.

12 Claims, 2 Drawing Figures

METHOD FOR PRODUCING SUPPORTED RANEY NICKEL CATALYST

BACKGROUND OF THE INVENTION

This invention relates to improvements in the method of making a Raney nickel catalyst.

Raney nickel catalysts are well known hydrogenation catalysts, and supported catalysts of this material have been formed by a number of methods. Goldberger, U.S. Pat. No. 3,637,437 discloses flame spraying Raney catalyst material onto a substrate and then leaching the aluminum from the alloy. While the catalytic structures produced by this method are highly active, they are subject to spalling during the activation step, and the process is labor intensive and hence relatively costly. In addition, the mode of application often results in severe distortions of non-rigid substrates due to non-uniform heating.

Another method proposed involves forming a layer of aluminum and nickel and the interdiffusion of these metals to form a catalyst layer at the interface. Nickel can be the substrate, or can be applied as a layer to a substrate by electrodeposition, flame spraying, vapor phase deposition, or other suitable means. U.S. Pat. No. 3,846,344 to Larson et al. exemplifies this prior art, and shows interdiffusion of aluminum and nickel at a temperature below the melting point of aluminum.

Under these temperature conditions the alloy $Ni_2Al_3$ is produced as a major product. This is undesirable in that it is difficult to activate during the subsequent leaching operation with aqueous sodium hydroxide solution. The desired phase, $NiAl_3$, which is readily activated and is the precursor to the active catalyst, is formed in a thin layer (about 0.025 mm) between the $Ni_2Al_3$ and the Al. Catalysts prepared by the low temperature interdiffusion process are therefore relatively short lived because of the thin layer of active catalyst produced.

SUMMARY OF THE INVENTION

The invention is directed to the production of a relatively thick layer of $NiAl_3$ on a nickel substrate. Said layer is the precursor of a Raney nickel catalyst. The method involves coating a nickel substrate with molten aluminum or aluminum-nickel alloy to form the specimen, then heat treating above the melting point of aluminum and quenching at a temperature which favors the formation of $NiAl_3$. Subsequently, the coated substrate or specimen is leached with sodium hydroxide solution to produce the supported Raney nickel catalyst.

It is an object of the present invention to provide an inexpensive and efficient method to produce a superior supported Raney nickel catalyst.

It is a further object of this invention to prepare a precursor for a supported Raney nickel catalyst by coating a nickel substrate with molten aluminum or aluminum-nickel alloy, heat treating the substrate and the integral coating at a temperature above the melting point of aluminum, and then quenching at a temperature favoring the production of $NiAl_3$. The molten metal bath advantageously comprises 70% to 100% aluminum and 0% to 30% nickel, with a most preferred composition of 70% aluminum and 30% nickel, where all compositions are percent by weight.

It is a further object to conduct the heating and quenching in molten salt baths at the appropriate temperatures.

It is a further object to conduct the heat treatment at a temperature range of from 700° C to 1133° C with a more preferred range of 950° C to 1100° C and a most preferred range of 1050° C to 1080° C, and the quenching temperature at a range of from 25° C to 854° C, with a more preferred range of 640° C to 750° C, and a most preferred temperature of 700° C.

It is yet another object to provide a molten salt bath for heat treatment comprising 50 pct to 100 pct cryolite, 0 pct to 25 pct NaCl, and 0 pct to 25 pct LiF with a more preferred composition consisting of 75 pct to 100 pct cryolite, 0 to 20 pct NaCl, and 0 to 10 pct LiF, with the most preferred composition of 92 pct cryolite, 8 pct LiF, where all compositions are percent by weight.

It is another object to provide a quenching bath of molten salt, oil, or other nonaqueous medium; the most preferred composition for the quenching medium being 65.5 pct $CaCl_2$-34.5 pct NaCl, where compositions are percent by weight; the said preferred salt bath being useful in the temperature range 500° C to 854° C.

It is a further object to leach the so prepared Raney nickel precursor with aqueous sodium hydroxide solution to form supported Raney nickel catalyst.

Further objects will be apparent from the following specification and drawing.

DESCRIPTION OF THE INVENTION

Raney nickel catalysts are useful in a number of reactions including the reaction of carbon-monoxide and hydrogen to form methane. In this reaction the use of a supported Raney nickel catalyst, i.e., where the Raney nickel forms a layer on a substrate, is highly desirable. By our method we have prepared Raney nickel catalysts having a thickness of from 0.25 to 0.80 mm on a nickel substrate.

In general, the method consists of dip coating a nickel substrate with molten aluminum or aluminum-nickel alloy and then heat treating the coated substrate (hereinafter the specimen) under conditions to form the desired Raney nickel alloy coating. As the nickel substrate, a nickel support may be employed, such as a nickel sheet. Alternately, the nickel support may be a nickel coating on a base, such as another metal or an inorganic refractory material. The nickel may be applied by any means known to the art such as electrodeposition, flame spraying, vapor phase deposition, etc. In order to provide greater support for the aluminum, the nickel surface may be indented, or a nickel screen may be spot molded to the surface, or the substrate may have a large number of perforations. The use of screen is a particularly desirable means of providing for increased retention of the molten aluminum or aluminum-nickel alloy since it serves to retain a thick layer by capillary action. However, to perform its function the screen must have a wire diameter sufficiently large so that it will not completely dissolve during the heat treatment. The molten aluminum-nickel coating alloy may contain up to 30% nickel.

While the various heating operations described herein may be carried out in an inert atmosphere, we have found that the invention can be carried out advantageously in a molen salt bath at a temperature range of from 700° C to 1133° C, a preferred range of 950° C to 1100° C and a most preferred range of 1050° C to 1080° C. This prevents oxidation of the molten metal bath and provides rapid heating of the substrate. After the heat treatment, the specimen is quenched at a temperature favoring the formulation of NiAl₃. This is within the range of from 640° C to 854° C as shown in the phase diagram of FIG. 1 and is conveniently carried out in a second molten salt bath. Instead of a molten salt bath for quenching, it may be possible to employ an oil bath, Dowtherm or other non-aqueous medium. The eutectic mixture of 65.5% CaCl₂ and 34.5% NaCl is suitable for this purpose, and serves additionally to replace any insoluble fluoride salt on the specimen. Thereafter the latter is cooled, washed with water, and activated with a sodium hydroxide solution.

The following examples illustrate preferred embodiments of the invention:

EXAMPLE 1

Figure 2:
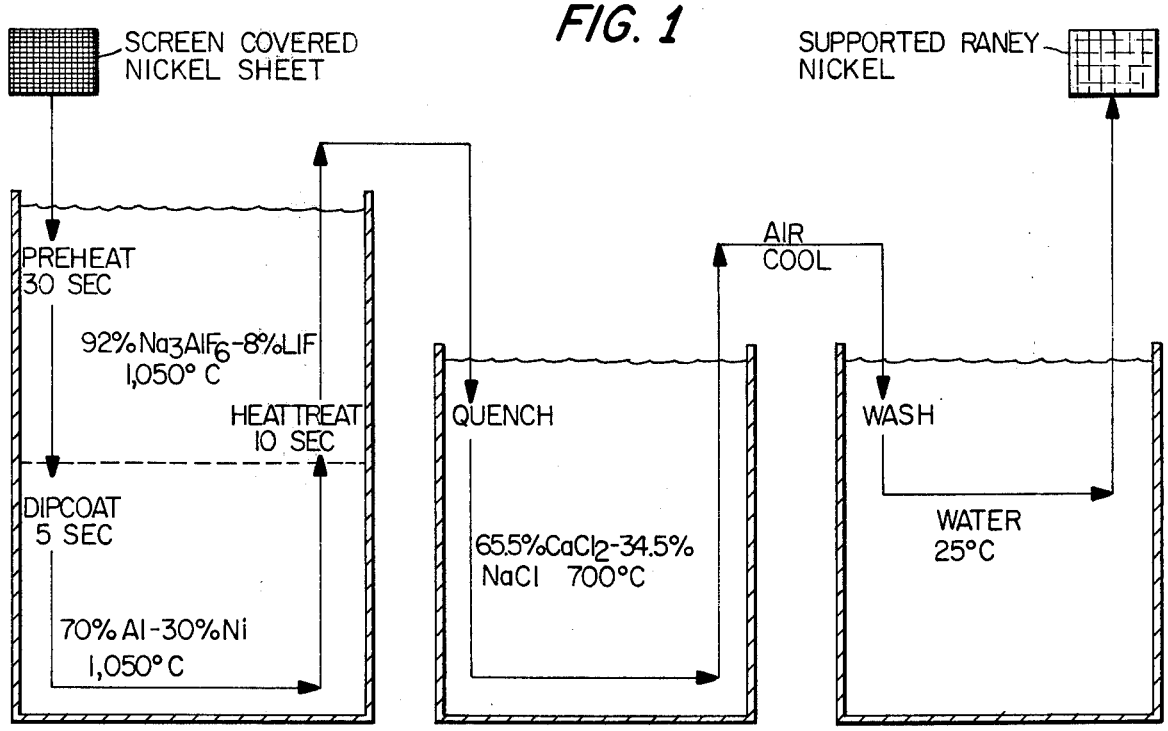
FIG. 2 is a flow diagram for the dip coating process showing the salt bath and aluminum metal compositions of Example 5.

This example was carried out in a manner similar to that shown in the flow diagram of FIG. 2, but with a different salt bath and aluminum metal composition. Aluminum pieces sufficient to form a molten pool 8 cm. deep were placed in a graphite crucible and covered with an equal depth of a mixture, in weight percent, of 50% cryolite, 25% NaCl and 25% LiF. The crucible was placed in an electric furnace and heated to a temperature of 1050° C to melt the aluminum and salt mixture. After the materials had melted the molten bath of salts formed a layer or column floating on the molten aluminum.

A nickel substrate was prepared by spot welding a 16 mesh nickel screen (0.305 mm wire) to a 0.5mm thick nickel sheet using 2 welds per square inch of surface. The screen was fastened to both sides of the nickel sheet.

The screened sheet was preheated to 1050° C for 5 seconds in the salt bath. Thereafter it was lowered into the molten aluminum below the salt bath for 1 second to secure a continuous coating of Al and then raised into the molten salt bath and held there for 2.5 seconds for heat treatment. Following the heat treatment, the specimen was quickly transferred to a cooling molten salt bath of a eutectic mixture of 65.5% CaCl₂, and 34.5% NaCl at a temperature of 700° C and kept there for 30 seconds for rapid cooling and to replace insoluble fluoride salts present. The specimen was then removed from the cooling molten salt bath, allowed to cool to room temperature, and washed with water to remove the salts.

The Raney nickel catalyst precursor layer was 0.53 mm thick and constituted NiAl₃, with less than 5% of Al-NiAl₃ eutectic. After washing, the specimen was activated by leaching with a 2% solution of NaOH at 80° C. to form a Raney nickel catalyst.

EXAMPLE 2

The procedure of Example 1 was repeated wherein the nickel support is immersed in the molten aluminum bath for from 1 to 15 seconds, the temperature of the first molten salt bath is from about 700° C to 1050° C, and the heat treatment is from 2½ to about 30 seconds. The temperature of the preheating salt bath and the aluminum were the same in each run, and the quenching salt bath was maintained at 700° C.

TABLE

| Run | Temperature °C | Dipping Time(sec) | Heat Treatment Time(sec) | Thickness of Reaction Layer |
|-----|---------------|-------------------|--------------------------|-----------------------------|
| 1 | 700 | 15 | 30 | .66 |
| 2 | 810 | 5 | 10 | .55 |
| 3 | 870 | 2 | 5 | .62 |
| 4 | 920 | 2 | 5 | .50 |
| 5 | 970 | 2 | 5 | .57 |
| 6 | 1,020 | 1 | 5 | .32 |
| 7 | 1,050 | 1 | 2.5 | .55 |

Figure 1:
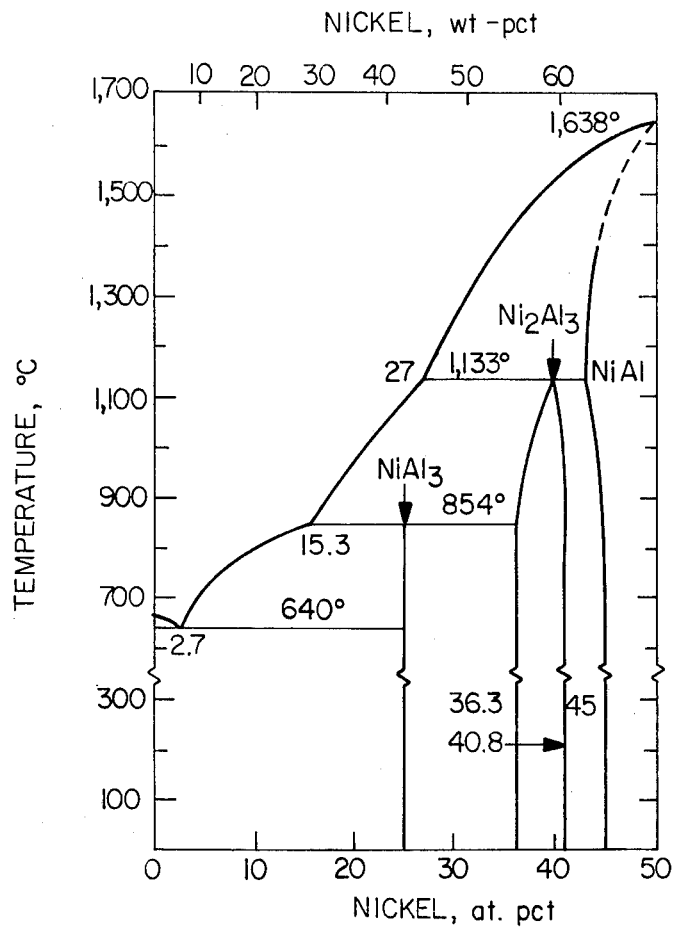
FIG. 1 is a aluminum-nickel phase diagram.

The range between 700° C and 1050° C yielded surface layer compositions consistent with the liquidus line of the nickel aluminum phase diagram shown in FIG. 1.

The optimum heat treatment temperature found is about 1050° C and results in a surface layer composition of about 42 weight % Ni and 58% Al.

EXAMPLE 3

The procedure of Example 1 was modified to include a double layer of nickel screen on both sides of the nickel sheet.

EXAMPLE 4

The flat sheet of Example 1 was replaced by a flat nickel sheet having embossed indentations, and by a sheet having perforations. The procedure of Example 1 was carried out with both sheets yielding satisfactory results. The use of a 1.02 mm thick nickel sheet perforated with 1.70 mm holes on 3.18 mm centers resulted in a catalyst thickness of 0.2 mm.

EXAMPLE 5

Cryolite premixed with 8 wt-pct lithium fluoride (flux) was placed in a graphite crucible and heated to 900° C in an electric furnace. After consolidation by melting occurred, additional flux was added to form a molten pool about 8 cm deep. Pieces of aluminum were then added to form a molten pool about 7 cm deep. Aluminum forms a pool below the protective molten flux. Pieces of nickel in the form of sheet 1.5 mm thick were then added slowly to produce a molten alloy containing 30 wt-pct nickel-70 wt-pct aluminum. The reaction between nickel and aluminum generates considerable heat and care must be exercised to prevent overheating. The temperature of the furnace was then increased to 1050° C.

A screen covered nickel substrate measuring 50 mm × 150 mm × 1.5 mm thick, prepared as described in Example 1, was dip coated, heat treated, quenched, and cleaned according to the flow diagram shown in FIG. 2. The supported Raney alloy coating was 0.6 to 0.8 mm thick and contained about 42 wt-pct nickel-58 wt-pct aluminum.

What is claimed is:

1. A process for making a Raney nickel catalyst comprising:
   dipping a nickel support or substrate into a bath comprising molten aluminum;
   removing the support from the bath of molten aluminum, the said support now being coated with a layer of aluminum to form a specimen;
   heat treating the specimen in the absence of oxygen at a temperature of from about 700° to 1133° C; and
   quenching the heat treated specimen at a temperature of from about 640° to 854° C in the absence of oxygen to form NiAl$_3$ as a solid phase coating on the substrate; and leaching the coated substrate with sodium hydroxide solution to produce a supported Raney nickel catalyst.

2. The process of claim 1 wherein the aluminum contains up to 30 percent by weight of nickel.

3. The process of claim 1 wherein the nickel support or substrate is formed by joining a nickel screen to at least one side of a nickel sheet.

4. The process of claim 1 wherein the nickel support or substrate is formed by indenting or perforating a nickel sheet.

5. The process for making a supported Raney nickel catalyst comprising the steps of:
   preheating a nickel support or substrate at from about 700° C to about 1133° C in a first molten salt bath;
   immersing said support in a bath comprising molten aluminum maintained at substantially the same temperature as the first salt bath;
   removing the support from said first molten salt bath whereby a continuous coating of aluminum on said support is obtained forming a specimen;
   heat treating the specimen in the said first salt bath;
   quenching the specimen in a second molten salt bath at a temperature of from about 640° C to 854° C to form NiAl$_3$ as a solid phase coating on the support; and leaching the coated support with sodium hydroxide solution to produce a supported Raney nickel catalyst.

6. The process of claim 5 wherein the aluminum contains up to 30 percent by weight of nickel.

7. The process of claim 5 wherein the nickel support is immersed in the molten aluminum bath for from 1 to 15 seconds, the temperature of the first molten salt bath is from about 700° C to 1050° C, and the heat treatment time is from 2½ to about 30 seconds; and
   wherein the higher the temperature of the molten aluminum and the salt bath the shorter is the immersion and the treatment time, respectively.

8. The method of claim 7 wherein temperature of the first molten salt bath is 1050° C.

9. The method of claim 7 wherein the first molten salt bath has the composition in weight percent of 50% cryolite, 25% NaCl and 25% LiF and the second molten salt bath has the composition 65.5% CaCl$_2$, 34.5% NaCl.

10. The method of claim 9 wherein the first molten salt bath has the composition in weight percent of 92% cryolite, 8% LiF.

11. The process of claim 5 which comprises:
    first forming a pool of molten aluminum within the first molten salt bath, so that said aluminum forms a layer below said salt bath; and
    thereafter performing the preheating step by immersing the nickel support in the first molten salt bath; and
    performing the coating step by immersing the substrate in the molten aluminum by lowering said substrate through the molten salt into the molten aluminum layer; and
    performing the heat treatment step by raising the aluminum coated substrate into the first molten salt bath.

12. The method of claim 8 wherein the first molten salt bath has the composition in weight percent of 50% cryolite, 25% NaCl and 25% LiF, and the second molten salt bath has the composition of 65.5% CaCl$_2$ and 34.5% NaCl, and the temperature of the first molten salt bath is about 1050° C.

* * * * *